Figure 1:
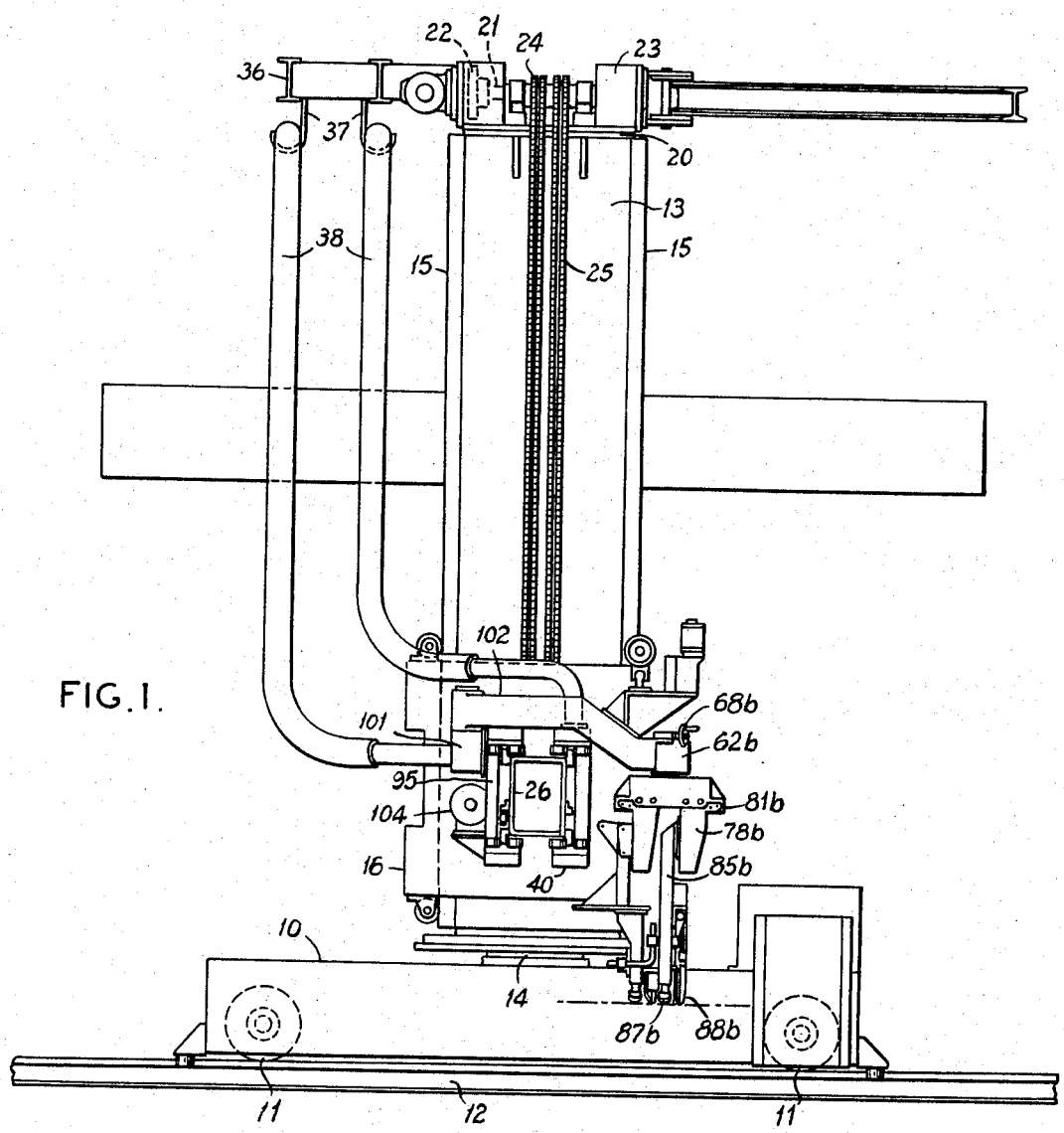

June 27, 1967   C. J. DINTER, JR   3,328,555
MANIPULATOR WITH AUTOMATIC GUIDING MECHANISM
Filed March 5, 1964   8 Sheets-Sheet 1

INVENTOR
CHARLES J. DINTER JR.
BY Cohn and Powell
ATTORNEYS

June 27, 1967  C. J. DINTER, JR  3,328,555

MANIPULATOR WITH AUTOMATIC GUIDING MECHANISM

Filed March 5, 1964  8 Sheets-Sheet 4

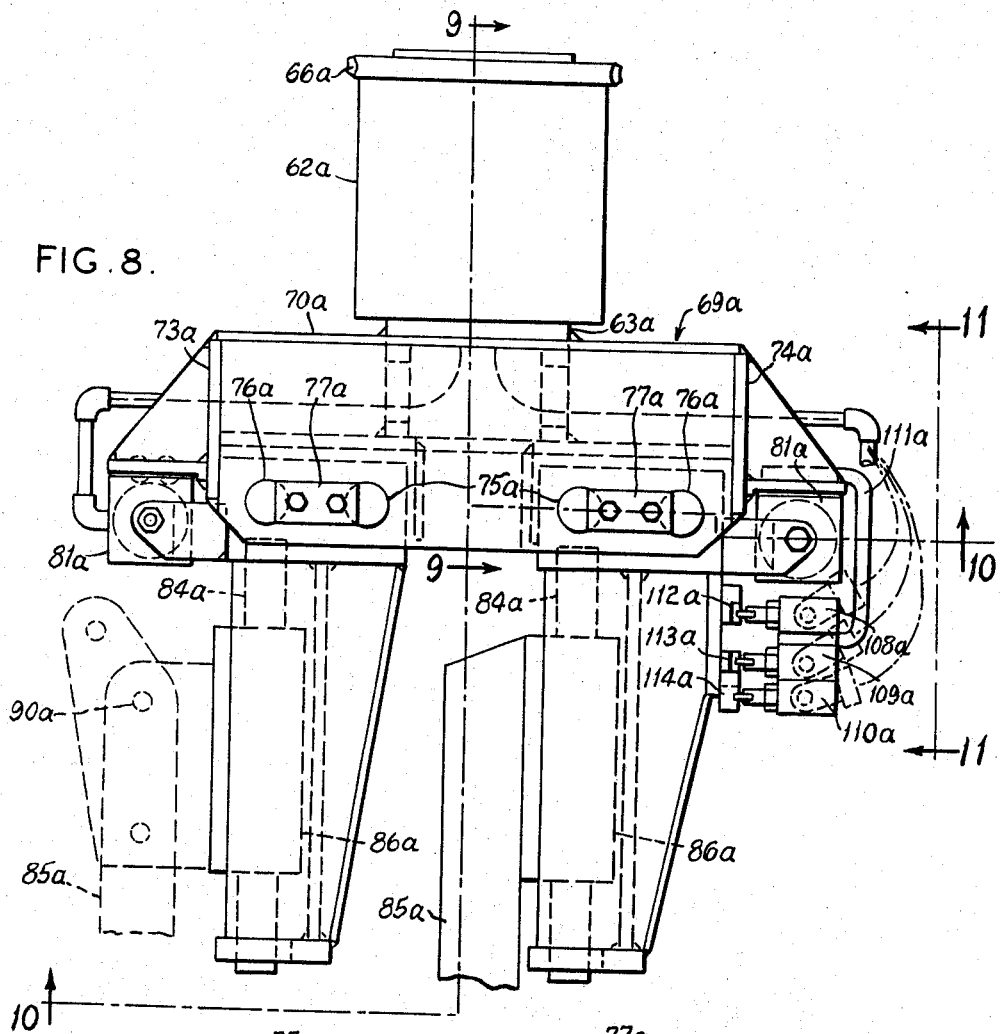
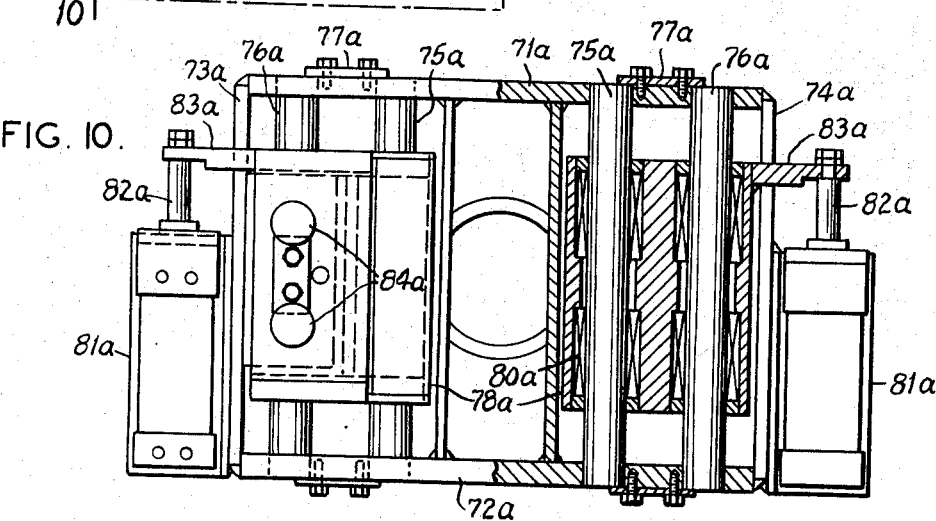

United States Patent Office 3,328,555
Patented June 27, 1967

3,328,555
MANIPULATOR WITH AUTOMATIC GUIDING MECHANISM
Charles J. Dinter, Jr., St. Ann, Mo., assignor to The Pandjiris Weldment Co., St. Louis, Mo., a corporation of Missouri
Filed Mar. 5, 1964, Ser. No. 349,573
15 Claims. (Cl. 219—125)

This invention relates generally to improvements in a welding machine, and more particularly to an improved automatic guiding mechanism for a welding head in a manipulator adapted to weld girders.

An important objective is achieved by the provision of a carriage movably mounting a welding head on a support frame, a welding element mounted on the head for movement between limits to compensate for minor variations in the weld seam while following such seam, and means moving the carriage and welding head when the welding element reaches either limit so as to bring the welding element relatively back to a position between the limits in order to provide further such minor adjustments within the limits.

Another important object is realized by the provision of means maintaining the welding element on the weld seam, a control means sensing the position of the welding element at and between the limits, and a power means connected to the carriage and actuated by the control means when the welding element reaches either limit in order to effectuate a major adjustment that returns the welding element relatively back to the position between the limits and thereby enables additional minor adjustments within such limits.

Still another important object is afforded by the provision of a pair of carriages movably mounted on the support frame, each carriage having a welding head, and a welding element mounted on each head as described previously. Means is provided for independently moving each carriage and its welding head along the support frame to effect the major adjustment of the welding element back to the operative position between the limits.

An important objective is attained by mounting the movable carriage on a boom of a welding manipulator.

Another important object is provided by the provision of a bracket that is slidably mounted on a slide means carried by the welding head, the bracket being movable between limits on the slide means, and the welding element being attached to and carried by the bracket.

Other advantages are provided by connecting a fluid ram to the bracket that tends to urge the bracket in a direction to hold the welding element on the seam, and by connecting the sensing control means to the bracket to regulate its positioning and hence determine the relative positioning of the welding element.

Yet another important object is achieved in that the sensing control means consists of a limit switch actuated by the bracket in each limit so that the power means moves the associated carriage in a direction to center the welding element and bracket between such limits, and another limit switch actuated by the bracket when the bracket is so centered to de-activate the power means and halt the movement of the associated carriage.

An important object is realized by the structural arrangement in which a first carriage is movably mounted on the front side of the boom and a second carriage is movably mounted on the rear side, yet the welding heads carried by the carriages are located on the same side of the boom.

Another important objective is afforded in that the welding heads are rotatively mounted on substantially vertical axes in order to align the welding elements in opposed lateral relation facing either inwardly or outwardly.

Another advantage is obtained by mounting at least one of the welding heads to its associated carriage in a manner one in front of the other, and by interconnecting the carriages by a latch so that such carriages move together as a unit along the boom, incident to welding seams substantially parallel to the path of movement of the carriages along the the boom.

It is an important object of the present invention to provide an automatic guiding mechanism for welding heads in a manipulator that is simple and durable in construction, economical to manufacture and assemble, highly efficient and automatic in operation, and which can be readily utilized by anyone with appropriate instruction.

Figure 2:
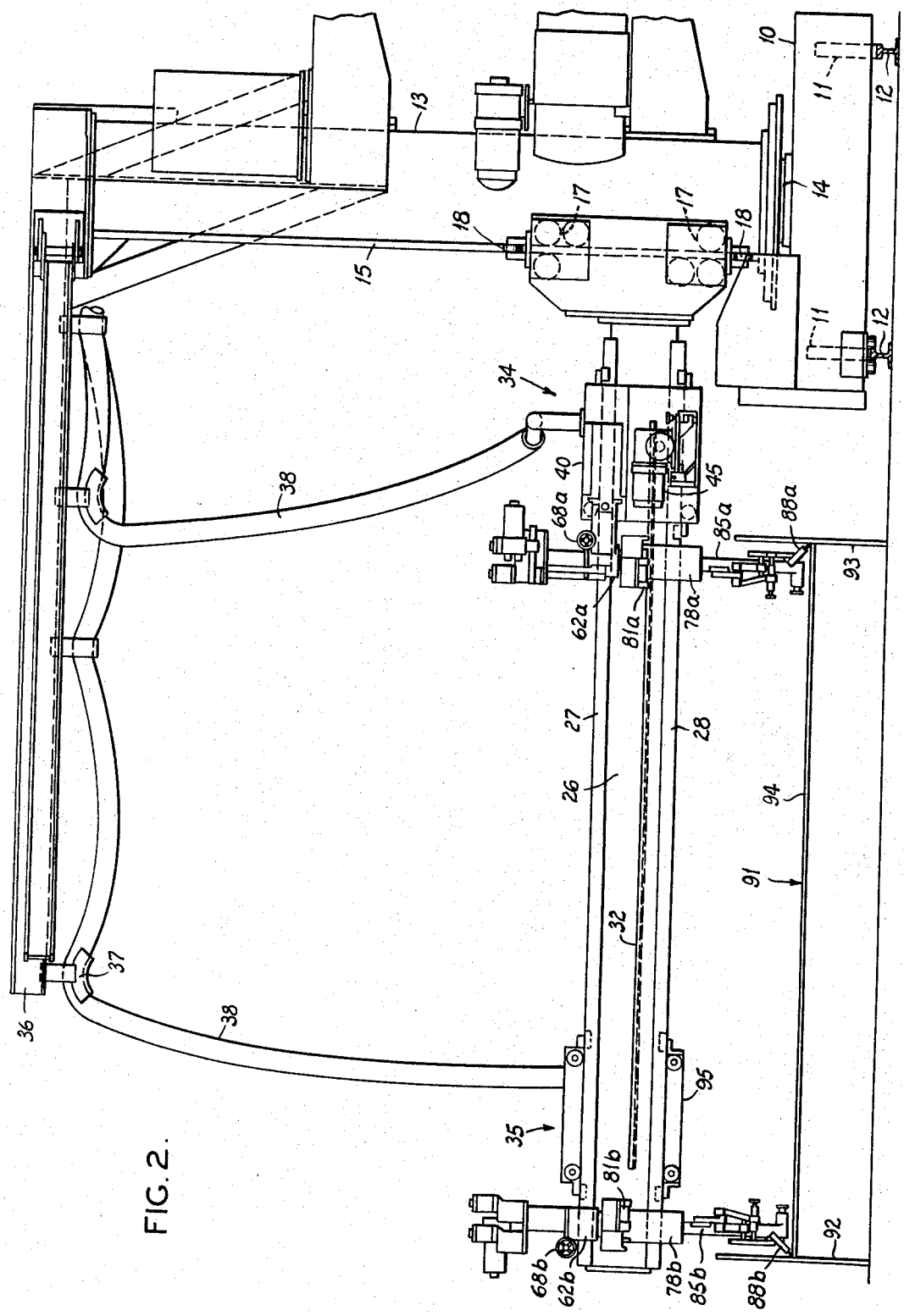
Figure 3:
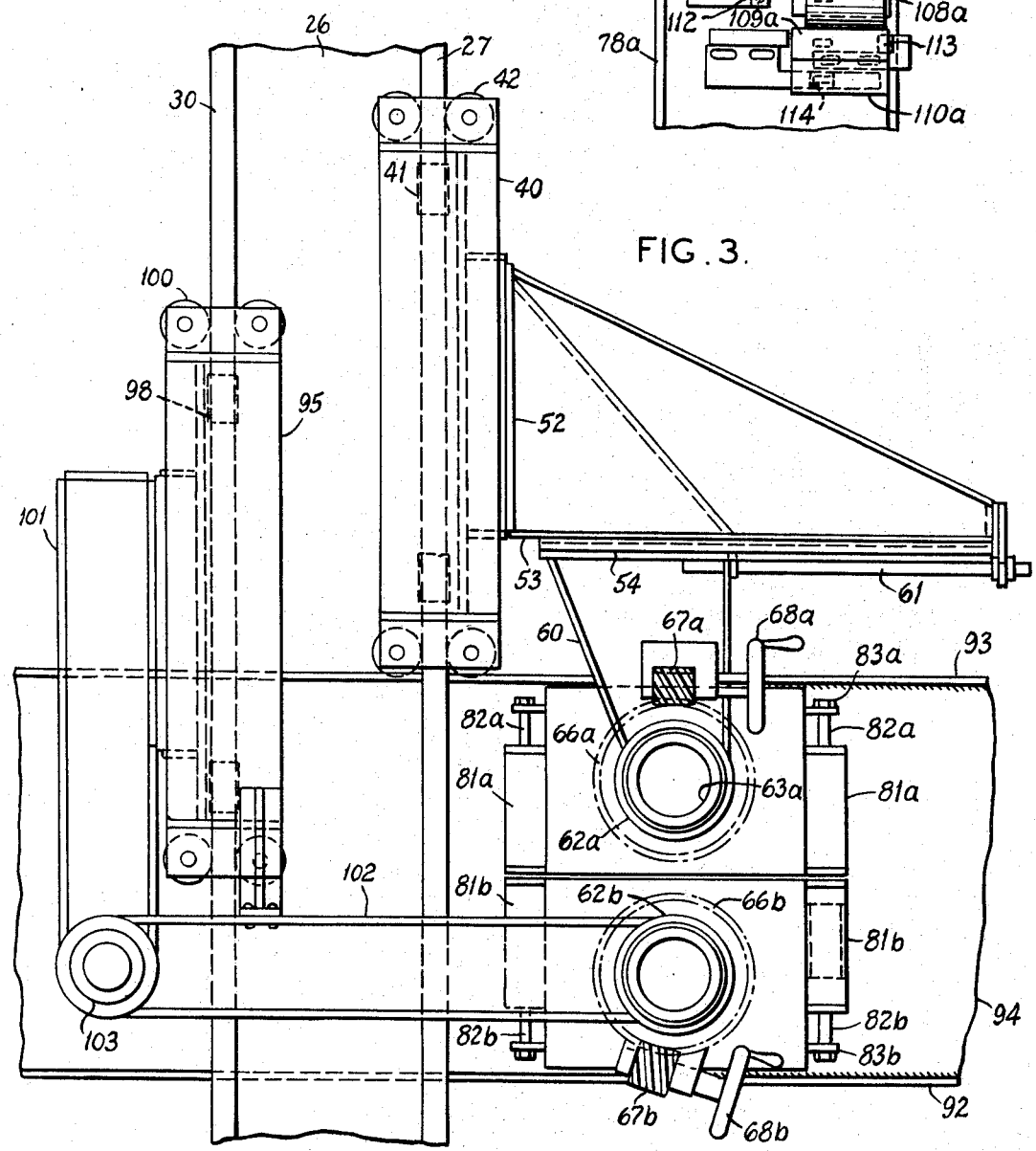
Figure 4:
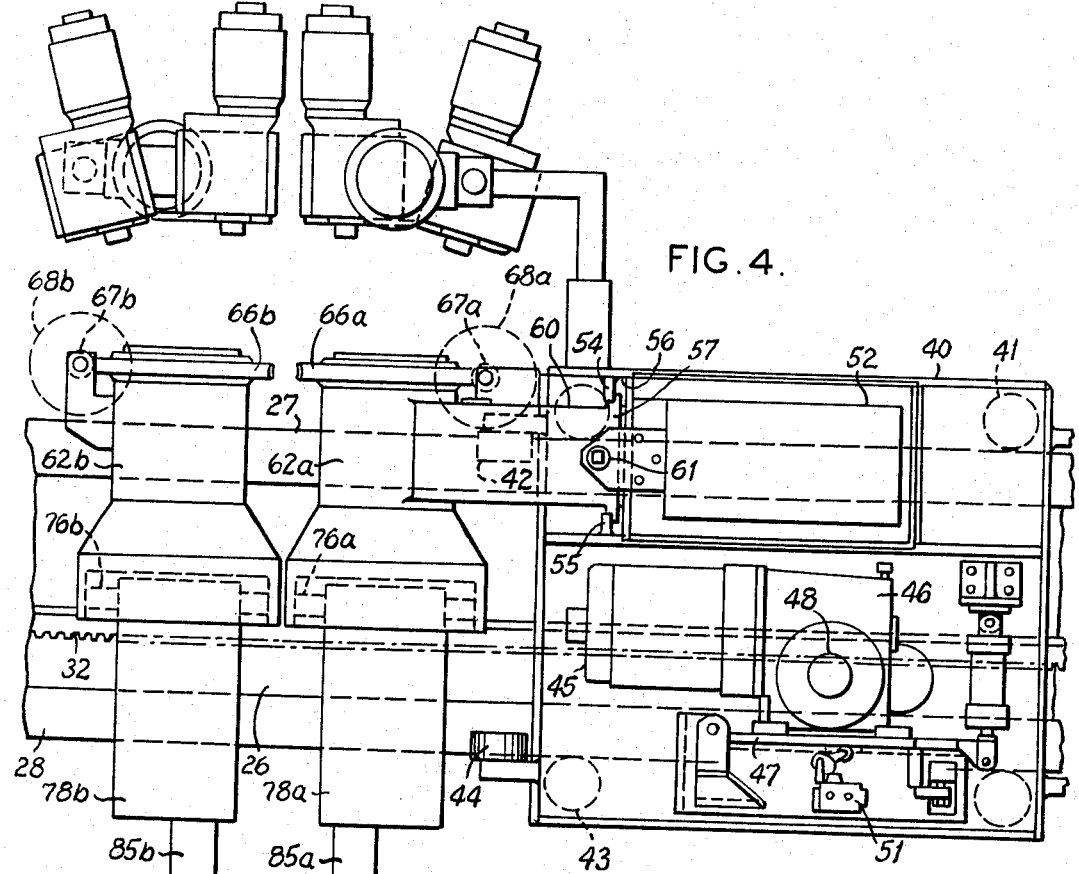
Figure 12:
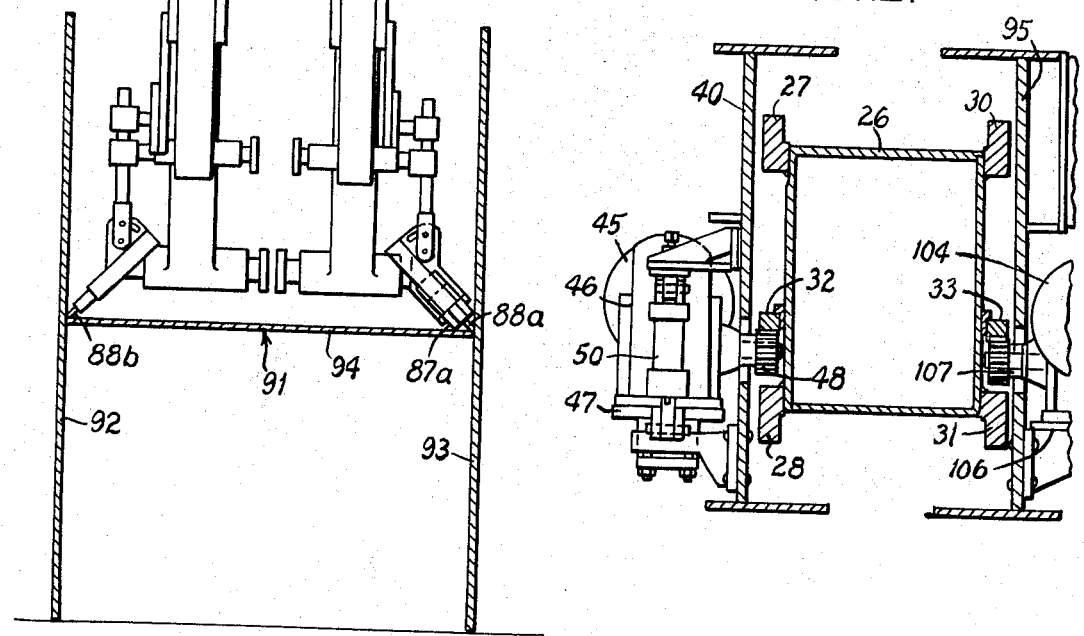
Figure 5:
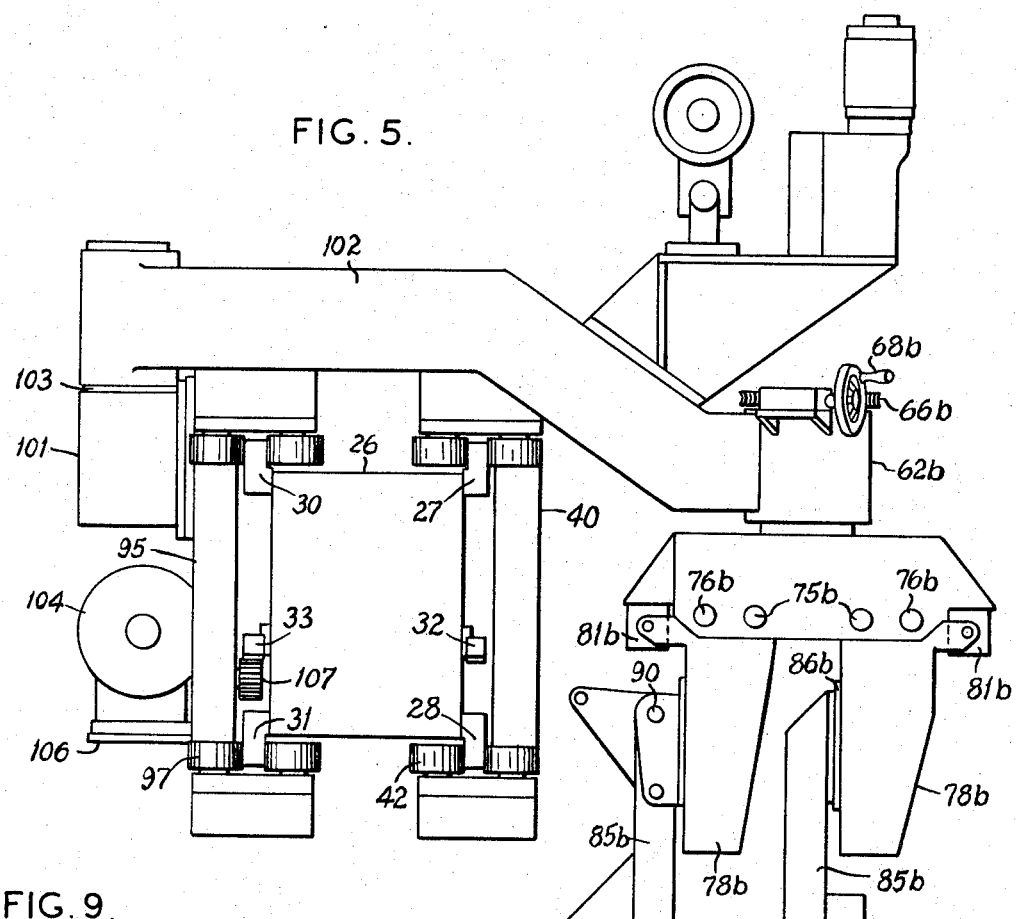
Figure 9:
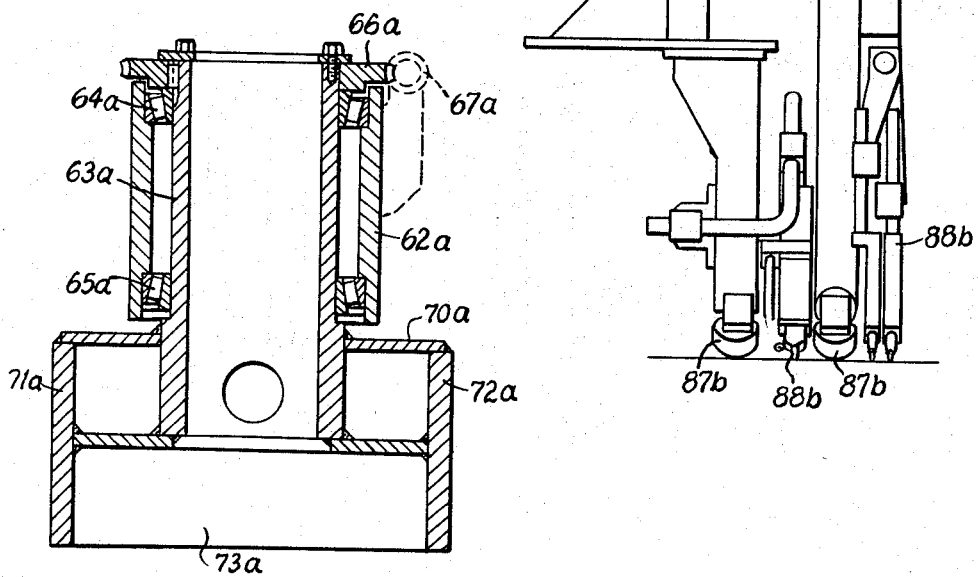
Figure 6:
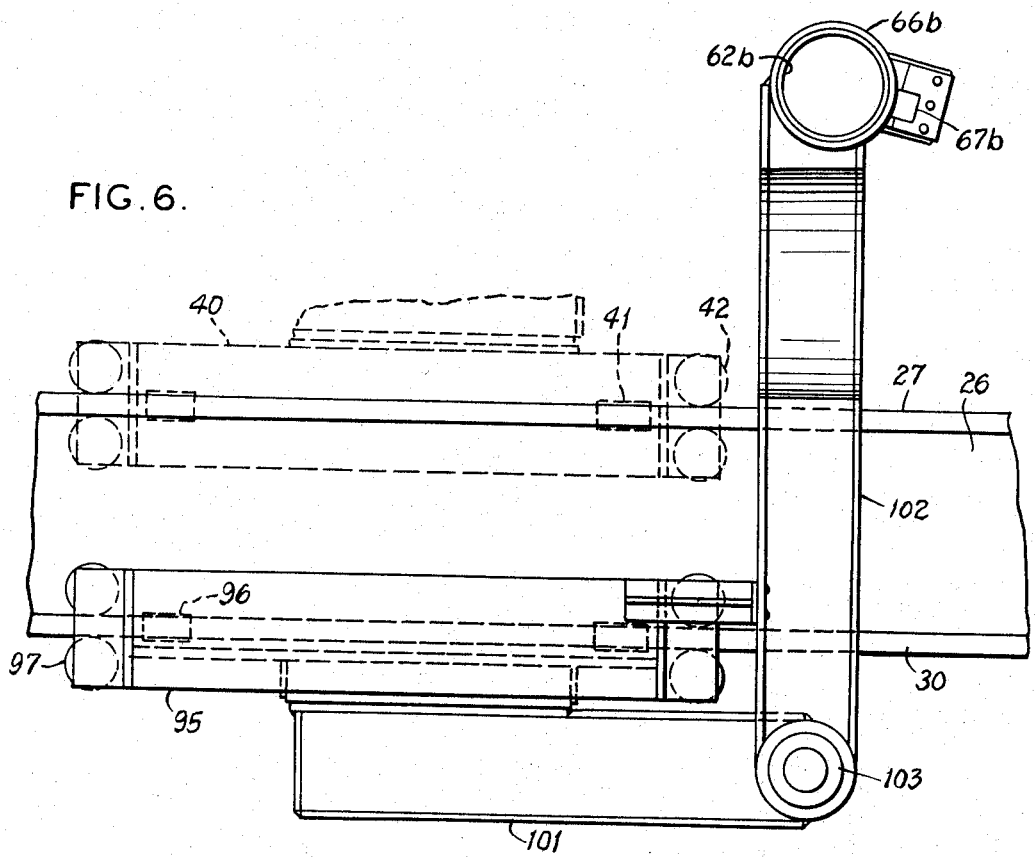
Figure 7:
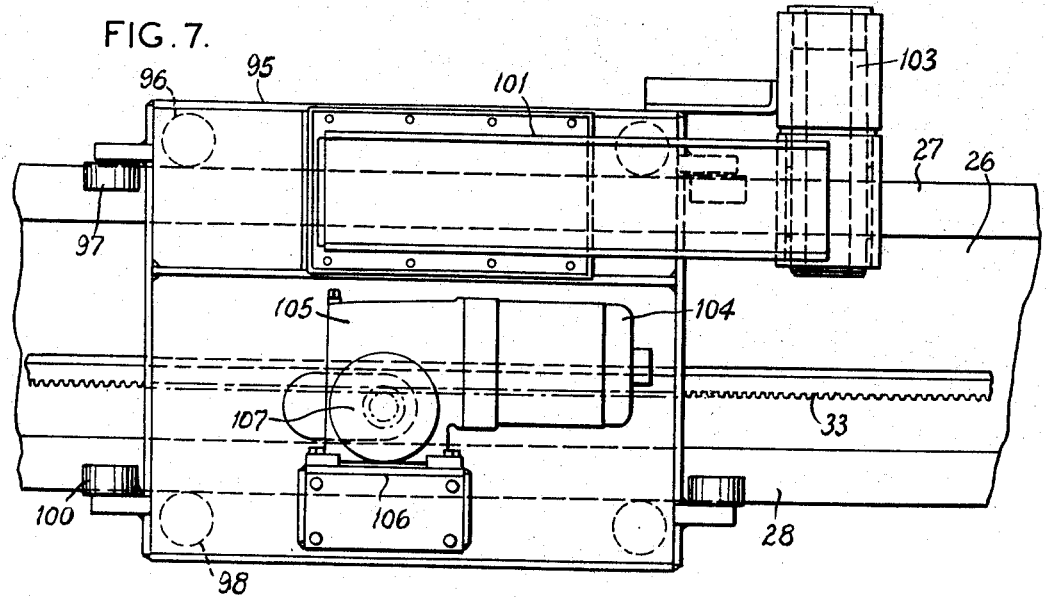
Figure 14:
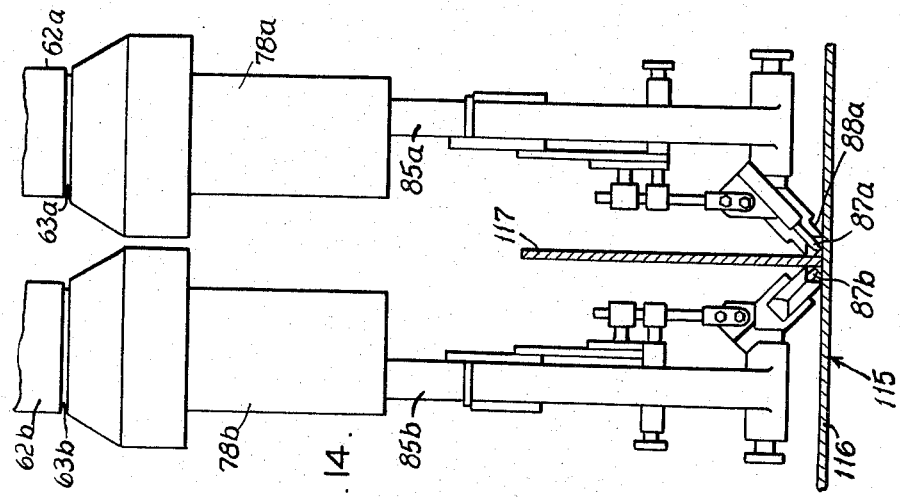
Figure 13:
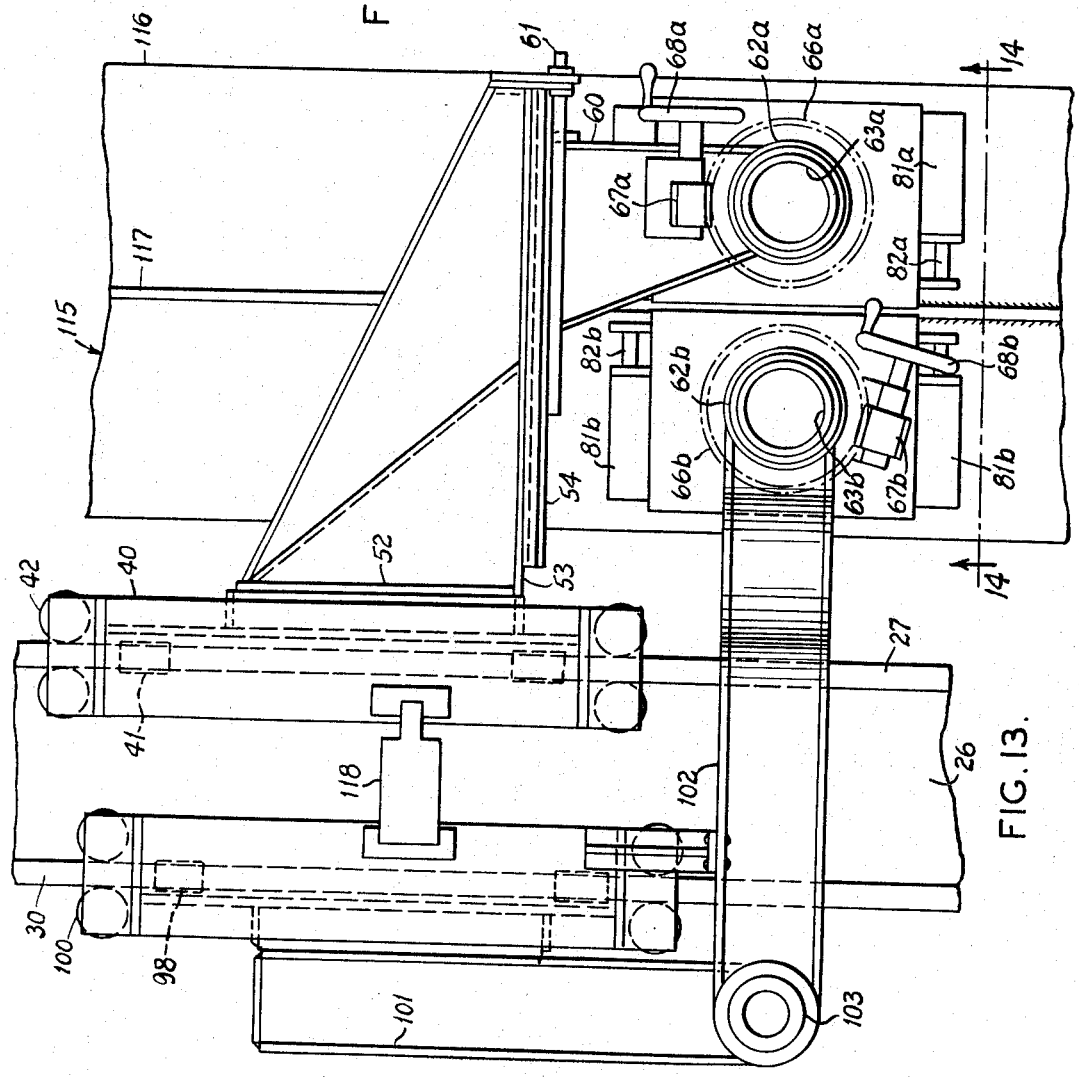

The foregoing and numerous other objects and advantages of the invention will more clearly appear from the following detailed description of a preferred embodiment, particularly when considered in connection with the accompanying drawings, in which:

FIG. 1 is a side elevational view of the manipulator;
FIG. 2 is a front elevational view of the manipulator shown in FIG. 1;
FIG. 3 is a top plan view of the carriages and welding heads shown in FIG. 2, moved closer together for a smaller work piece;
FIG. 4 is a front elevational view of the front carriage and welding heads shown in FIG. 3;
FIG. 5 is an end elevational view of the outermost welding head shown in FIG. 3;
FIG. 6 is a top plan view of the rear carriage and supporting frame;
FIG. 7 is a rear elevational view of the rear carriage;
FIG. 8 is a fragmentary side elevational view of a welding head;
FIG. 9 is a cross sectional view of the welding head as seen along line 9—9 of FIG. 8;
FIG. 10 is a view, partially in cross section, as seen along staggered line 10—10 of FIG. 8;
FIG. 11 is an end elevational view as seen along line 11—11 of FIG. 8;
FIG. 12 is a cross sectional view through the boom and carriages illustrating the drive connection of the carriage motors with the boom racks;
FIG. 13 is a top plan view similar to FIG. 3, but showing the carriages latched together and the welding heads adjusted to a position one in front of the other for a different welding operation, and
FIG. 14 is a side elevational view, partially in cross section, as seen along 14—14 of FIG. 13.

Referring now by characters of reference to the drawings, and first to FIGS. 1 and 2, it is seen that the manipulator includes a cart 10 having a plurality of wheels 11 that engage and ride on a pair of spaced, parallel rails 12. Mounted and carried on the cart 10 is an upstanding column 13. A swivel connection 14 between the cart 10 and column 13 allows the column 13 to turn about a substantially vertical axis. Attached to one side of the column 13 is a plate providing lateral tracks 15.

Reciprocatively mounted and carried by the column 13 is a crosshead 16, the crosshead 16 including side rollers 17 engaging opposite sides of the column tracks 15, and rollers 18 engaging the outer faces of tracks 15.

A platform 20 is mounted on the top of column 13. Supported on the top of platform 20 is a drive shaft 21 journaled in bearings 22 and driven by a power means, such as a motor 23. A plurality of sprockets 24 are drivingly attached to the shaft 21. Chains 25 engage the sprockets 24 and are attached to the crosshead 16. Upon actuation of the motor 23, the sprocket and chain drive 24–25 acts to raise or lower the crosshead 16 on the column 13, the crosshead 16 moving along the side tracks 15.

An elongate boom 26 constituting a support frame is attached to the crosshead 16 and is movable therewith. The boom 26 extends substantially horizontal to one side of the column 13. As is best seen in FIGS. 5 and 12, the boom 26 is tubular and generally rectangular in cross section. Mounted on the front face of boom 26 and extending substantially the entire length of such boom is a top carriage track 27 and a lower carriage track 28. Similarly, the rear face of boom 26 is provided with an elongate upper carriage track 30 and a bottom carriage track 31.

For reasons which will later appear, an elongate rack 32 is fixed to the front face of boom 26 while a corresponding and similar rack 33 is fixed to the rear face of the boom 26.

From FIG. 2 it is seen that a pair of welding units are movably mounted and carried by the boom 26, the inboard welding unit generally indicated by 34 being located closest to the crosshead 16 while the outboard welding unit generally indicated by 35 is located outwardly of the inboard unit 34. Overhead beams 36 are fixed to the top of column 13 and are disposed above the laterally extending boom 26. A plurality of hangers 37 are carried by the beam 36, the hangers 37 carrying flux lines 38 that communicate each of the welding units 34 and 35 with conveniently located flux hoppers.

The inboard welding unit 34 includes a carriage 40 mounted for movement along the front of boom 26. The carriage 40, best shown in FIGS. 3 and 4, includes top rollers 41 engaging the top face of the upper rail 27 and includes side rollers 42 engaging the opposite sides of the same top rail 27. Similarly, a pair of spaced rollers 43 engage the bottom face of the lower rail 28, while rollers 44 engage the opposite sides of the same rail 28. These rollers 41–44 cooperating with the top and bottom rails 27 and 28 guide the carriage 40 in its path of movement along the boom 26.

A power means is provided on the carriage 40 for automatically moving the carriage 40 along the boom 26. This power means includes an electric motor 45 operatively connected to a speed reducer 46 that is mounted on a pivoted platform 47. A pinion 48 is attached to a shaft extending from the speed reducer 46 through the carriage wall, the pinion 48 meshing with the front rack 32. The motor platform 47 can be selectively moved up or down by ram 50 to engage or disengage respectively the pinion 48 and rack 32. When the platform 47 is lowered to disengage the pinion 48 from the rack 32, the platform actuates a switch 51.

Fixed to and extending forwardly from the carriage 40 is a triangularly shaped bracket 52 having a side plate 53. Upper and lower ribs 54 and 55 are carried by the bracket 52 and spaced from the plate 53 to provide guideways 56 in which a plate 57 is slidably mounted for movement toward and away from the carriage 40, and hence in a direction toward or away from the boom 26. A support arm 58 is fixed to the adjustable plate 57 and extends laterally from the bracket plate 53. A screw shaft 61 is mounted to the front end of bracket 52 and is threadedly attached to the support arm 60. By turning the screw shaft 61, the support arm 60 will travel along the screw shaft 60 and thereby adjust the position of the support arm plate 57 within the guideways 56.

A welding head is carried by the support arm 60. The construction of the welding head is best shown in FIGS. 8, 9 and 10. The parts comprising the welding head of the inboard unit 34 are denoted by a reference numeral having the suffix letter *a*. The corresponding parts of the outboard unit 35 are denoted by the same numeral with the suffix letter *b*. Accordingly, a detailed description of the inboard unit 34 will suffice for the outboard unit 35.

Briefly, a cylindrical collar 62a is secured to the support arm 60. A tubular shaft 63a extends through and is rotatively mounted within the collar 62a by bearings 64a and 65a. A gear 66a is attached to the upper end of tubular shaft 63a, the gear 66a meshing with a worm gear 67a that is carried by a bracket fixed to the support arm collar 62a. A crank wheel 68a is operatively connected to the worm gear 67a and is utilized to rotate the tubular shaft 63a. Of course, appropriate power means, such as an electric motor, can be conveniently utilized to turn the worm gear 67a if desired.

The lower end of tubular shaft 63a extends below the collar 62a and is attached to a bottom-open box-like housing 69a including a top wall 70a, side walls 71a and 72a, and end walls 73a and 74a.

At each end of the housing 69a, there are a pair of spaced, substantially parallel slide pins 75a and 76a, such pins extending between the side walls 71a and 72a and held in place by detachable plates 77a. Slidably mounted on each pair of slide pins 75a and 76a is a bracket leg 78a. A plurality of slide bearings 80a located and retained within the bracket leg 78a slidably engage each pin 75a and 76a.

A fluid ram 81a is fastened to each of the end walls 73a and 74a, the piston 82a of each ram 81a being fastened to a projecting arm portion 83a of one of the bracket legs 78a. These rams 80a act under fluid pressure, either air or liquid, and tend to urge the bracket legs 78a in one direction along the slide pins 75a and 76a, as will be explained later.

Each of the bracket legs 78a holds a pair of spaced vertical slide pins 84a, shown in FIGS. 8 and 10. A support arm 85a including a sleeve 86a is slidably mounted on the slide pins 84a for movement between limits in a vertical direction. The lower end of the support arm 85a is provided with a guide roller 87a inclined at an angle to the vertical to engage the angularly related plates of the girder defining the weld seam. Welding elements generally indicated at 88a are carried by the support arm 85a and are positioned directly at the weld seam when the guide roller 87a is correctly placed. Of course, appropriate adjustment mechanism is provided for the welding elements 88a so that their positioning can be made with precision.

Under some types of welding operations, it is desirable only to have one support arm 85a depending in operative position. Under these circumstances, one of the support arms can be swung upwardly out of the way as a result of the hinge connection 90a, as best seen in FIG. 5.

The work piece to be welded can be an H-shaped girder indicated generally by 31 in FIG. 2 consisting of vertical side plates 92 and 93 interconnected by an intervening horizontal plate 94. The guide wheels 87a of the inboard welding unit 34 are disposed at the juncture of side plate 93 and horizontal plate 94, and engage such plates to maintain the welding elements 88a at the weld seam. The fluid ram 81a tend to urge the bracket legs 78a and hence the welding elements 88a in a direction to hold the guide wheels 87 tightly against the plate juncture and to hold the weld elements 88a at the weld seam. To compensate for any minor variations in a horizontal plane along the weld seam, the bracket legs 78a will move within limits along the supporting slide pins 75a and 76a. To compensate for any minor variation in a vertical direction along the weld seam, the supporting arms 85a will slide vertically within limits along the slide pins 84a.

The outboard welding unit 35 includes a carriage 95 mounted on the rear side of the boom 26. A pair of rollers 96 at the top of the carriage 95 engage the top face of the upper rail 30 while a plurality of rollers 97 engage the opposite sides of the same upper rail 30. Another pair of rollers 98 carried at the bottom of carriage 95 engage the bottom face of the lower rail 31. Similarly, a plurality of rollers 100 engage the opposite sides of the same rail 31. These rollers 96–100 engaging the rear rails 30 and 31 maintain the carriage 95 in a predetermined path of movement along the rear side of boom 26.

Fastened to the rear of carriage 95 is a bracket 101 extending beyond the outside end of carriage 95. An arm 102 is pivotally mounted by connection 103 to the bracket 101, the arm 102 extending over the top of the boom 26 and beyond the front side of the boom 26. A welding head of substantially the same construction as that previously described with respect to the inboard unit 34 is carried by the forward end of arm 102, this welding head is illustrated in FIG. 5 and the corresponding parts are designated by the same reference numerals only with the suffix letter $b$. It will be noted that the welding heads of the inboard and outboard units 34 and 35 are located on the front side of the boom 26.

Carriage 25 of the outboard unit 35 is moved under power along the boom 26. This power means consists of a motor 104 and a speed reducer 105 mounted on a platform 106 attached to the carriage 95. A shaft from the speed reducer 105 extends through the carriage 95 to engage a pinion 107 with the rear rack 33. Upon energization of the motor 104, the pinion 107 engaging the rack 33 will move the carriage along the boom 26. As will be explained later, the carriages 40 and 95 of the inboard and outboard units 34 and 35 respectively can be independently adjusted and moved along the boom 26.

A control mechanism is provided for the welding head of each of the inboard and outboard units 34 and 35. The detailed construction of this control mechanism as applied to the inboard unit 34 is best shown in FIGS. 8 and 11. A detailed description of this mechanism will suffice for the same type of control mechanism utilized on the outboard unit 35. The parts of the inboard unit 34 are designated by a reference numeral with the suffix letter $a$, while the corresponding parts of the outboard unit 35 have the same reference numeral with the suffix letter $b$.

The control mechanism includes three limit switches $108a$, $109a$ and $110a$ carried by a U-shaped bracket $111a$ fixed to the end housing wall $74a$. Three coacting switch cams $112a$, $113a$ and $114a$ are attached to the bracket leg $78a$ and disposed in position to engage and cooperate with limit switches $108a$, $109a$ and $110a$ respectively. Switches $108a$ and $109a$ determine the range of sliding movement of bracket leg $78a$ along the slide pin $75a$ and $76a$.

For example, when the bracket leg $78a$ reaches one limit, switch $108a$ is actuated by engagement with the cam $112a$. This action energizes the motor 45 to move the carriage 40 in a direction so as to return the bracket leg $78a$ to a position within the range of movement, preferably to a center position. When the bracket leg $78a$ is centered, switch $110a$ is actuated by engagement of cam $114a$ which causes a de-energization of the motor 45. Thus it is seen that the bracket leg $78a$ is centered to permit further minor adjustments to compensate for minor variations or deviation in the weld seam within the range of movement. Of course, if the bracket leg $78a$ moves to the opposite limit of movement, the switch $109a$ is actuated by engagement with the cam $113a$ to energize the motor 45 and cause movement of the carriage 40 in the opposite direction along the boom 26 in order to center the bracket leg $78a$ in the manner described.

As stated above, a similar control mechanism is supplied for the welding head of the outboard welding unit 35 so that the motor 104 of the rear carriage 95 is energized in the appropriate direction when the bracket legs $78b$ are moved to either limit of their range of movement so as to run the carriage 95 along the boom 26 until the bracket legs $78b$ are centered within the appropriate range of movement, all as described previously.

From the above description of parts, it is seen that the welding elements $88a$ are maintained at the weld seam and that the bracket legs $78a$ move within a limited range of movement to compensate for any minor horizontal variation of the weld seam. If the bracket legs $78a$ or $78b$ are moved to either of their limits, a control mechanism automatically moves either or both of the carriages 40 and 95 in the appropriate direction along the boom 26 until the bracket legs $78a$ and/or $78b$ are recentered within the range of movement, thereby providing a major adjustment which then allows subsequent minor adjustments within the range of movement.

It will be understood that a similar type of control mechanism can be supplied for the movable support arms $85a$ that move within a range of movement on the slide pins $84a$. This type of limit control would actuate the crosshead motor 23 to raise or lower the crosshead 16 and hence raise or lower the boom 26 in order to return the support arm $85a$ to a center position within its vertical range of movement.

It is thought the operation and functional advantages of the automatic guiding mechanism in the welding machine have become fully apparent from the foregoing detailed description of parts, but for completeness of disclosure the operation of the manipulator will be briefly set forth.

It will be assumed that an H-shaped girder 91 is to be constructed. First, the inboard unit 34 is located along boom 26 so that the welding elements $88a$ are disposed at the weld seam and the guide wheels $87a$ engage the plates 93 and 94 to hold the welding elements $88a$ at the weld seam. In the initial starting position, the bracket legs $78a$ of the inboard unit 34 are located in an approximate center position along the slide pins 75 and 76 between its limits of movement. The fluid rams $81a$ will exert sufficient pressure to hold the guide wheels $87a$ against the plates and hence hold the welding elements $88a$ at the weld seam.

The outboard welding unit 35 is similarly located by running the carriage 95 along the boom 26 until the welding elements $88b$ are located at the weld seam provided by the juncture of plates 92 and 94. Again, it will be noted that the guide wheels $87b$ are urged against such plates and the welding elements $88b$ held at the weld seam under the action of fluid pressure of the fluid rams $81b$ of the welding head carried by the outboard unit 35. Also, it will be noted that the bracket legs $78b$ of this welding head are preferably centered within the limits of movement.

As the cart 10 is moved along the rails 12, the welding operation takes place. If there is any minor variation in a horizontal direction along either of the weld seams, the bracket legs $78a$ or $78b$ of the appropriate welding head of inboard or outboard units 34 and 35, will move along their associated slide pins within the limits of movement. If the limit of the bracket legs $78a$ or $78b$ and hence the welding elements $88a$ or $88b$ of either inboard or outboard unit 34 or 35 is reached, the motor 45 or 104 of the associated unit will be energized to move the carriage 40 or 95 in a direction to center the welding elements $88a$ or $88b$ within its range of movement to enable further minor horizontal adjustments within the range of movement.

It will be readily understood that this automatic adjustment of either carriage 40 or 95 can be made independently of the other as the need arises. In either welding unit 34 or 35, a minor adjustment in either direction is permitted by the welding elements $88a$ or $88b$ but if the limits of such movements are exceeded, there will be caused automatically a major adjustment in the same direction as by moving the associated carriage 40 or 95 along the boom 26 to center the welding elements $88a$ or $88b$ within the limits of movement for additional minor adjustments.

The H-shaped girder 91 to be assembled by this manipulator can be of any width within a wide range. For example, in FIGS. 3 and 4 an H-shaped girder of lesser width is illustrated. To provide an automatic welding operation in these circumstances, the welding heads of the welding units 34 and 35 are brought close together in side by side relation by positioning of the associated carriages 40 and 95 along the boom 26. Of course, the same automatic adjustments, both minor and major, of the welding elements 88a and 88b independently and by readjustment of the associated carriages is realized as described previously.

It is also possible to perform fillet welding on the outside rather than on the inside as illustrated in FIGS. 2 and 4. For example, as shown in FIGS. 13 and 14, a fillet welding can be accomplished to manufacture an inverted T-shaped girder generally indicated at 115 and consisting of a horizontal plate 116 and an intermediate vertical plate 117. In this assembly, the welding operation takes place by moving the welding units 34 and 35 along the boom 26 while the manipulator cart 10 remains stationary. First, the girder 115 is arranged so that the weld seams are disposed substantially parallel to the boom 26, and hence parallel to the paths of movement of the welding units 34 and 35 along the boom 26.

First, the welding head of the outboard unit 35 is rotated by turning the worm gear 67b until the welding elements 88b are pointed outwardly at the juncture of the girder plates 116 and 117 and so that the guide wheels 88b engage such plates to hold the welding elements 88b at the weld seam. The fluid rams 81b tend to urge the bracket legs 78b and the associated welding elements 88b of this outboard welding unit in a direction to hold the guide wheels 87b against the girder plates 116 and 117.

Then, the inboard welding unit 34 is moved along the boom 26 until the carriages 40 and 95 are disposed oppositely as shown in FIG. 13. The screw shaft 61 is manipulated to bring the support arm 60 and hence the welding head outwardly along the bracket plate 53 and in a direction away from the associated carriage 40 so that when the welding head is rotated, it can assume a position directly in front of the welding head of the outboard unit 35. When the welding head of the inboard unit 34 is rotated in a directly opposing relation, the welding elements 88a are disposed at the juncture of the girder plates 116 and 117 and its associated guide wheels 87a engage such plates to hold the welding elements 88a at the weld seam. A latch mechanism 118 interconnects the carriages 40 and 95 so that such carriages move together as a unit along the boom 26. To perform the welding operation, one of the motors of one carriage is energized so that both inboard and outboard units 34 and 35 move together along the boom 26.

Although the invention has been described by making detailed reference to a preferred embodiment, such detail is to be understood in an instructive, rather than in any restrictive sense, many variants being possible within the scope of the claims hereunto appended.

I claim as my invention:

1. In a welding machine:
   (a) a boom,
   (b) a carriage movably mounted on the boom,
   (c) a welding head carried by the carriage,
   (d) a welding element,
   (e) means mounted on the head for movement between limits, the last said means carrying the welding element,
   (f) pressure means tending to urge the last said movable means in a direction to maintain the welding element on a weld seam, and
   (g) means selectively moving the carriage on the boom when the welding element reaches either limit so as to bring the welding element relatively back to a position between the limits in order to provide further minor adjustments within the limits to compensate for minor variations in the weld seam.

2. In a welding machine:
   (a) a boom, a carriage movably mounted on the boom,
   (b) a welding head carried by the carriage,
   (c) slide pins disposed substantially horizontal and attached to the welding head,
   (d) a bracket slidably mounted on the horizontal slide pins for movement between limits,
   (e) substantially vertical slide pins attached to the bracket,
   (f) a support arm slidably mounted on the vertical slide pins for movement between limits,
   (g) a welding element carried by the support arm,
   (h) a fluid ram connected to the bracket and tending to urge the bracket in a direction to hold the welding element on a weld seam,
   (i) a pair of limit switches actuated by the bracket when the bracket reaches its limit of horizontal movement,
   (j) power means interconnecting the carriage and boom and activated by the pair of limit switches to move the carriage in a direction to bring the bracket relatively back to a position between its limits in order to provide further minor adjustments to compensate for minor horizontal variations in the weld seam, and
   (k) another limit switch actuated by the bracket when the bracket is substantially centered between the limits to de-activate the power means and halt carriage movement.

3. In a welding machine:
   (a) a substantially horizontal boom,
   (b) a first carriage movably mounted on the front side of the boom,
   (c) a second carriage movably mounted on the rear side of the boom,
   (d) a welding head carried by each carriage, the welding heads being located on the same side of the boom,
   (e) each welding head including substantially horizontally disposed slide pins,
   (f) a bracket slidably mounted on the horizontal slide pins for movement between limits,
   (g) substantially vertical slide pins attached to the bracket,
   (h) a support arm slidably mounted on the vertical slide pins for movement between limits,
   (i) a welding element fixed to the support arm,
   (j) a fluid ram connected to the bracket and tending to urge the bracket in a direction to hold the associated welding element on a weld seam,
   (k) the welding heads being rotatively mounted on substantially vertical axes in order to align the associated welding elements in opposed relation facing either inwardly or outwardly,
   (l) a rack extending along each side of the boom,
   (m) power means carried by each carriage, each power means including a pinion engaging the rack on the same side of the boom as the carriage and adapted to move the carriage along the boom,
   (n) a pair of limit switches actuated by each bracket in each limit of movement to activate the power means to move the associated carriage in a direction to bring the bracket and hence the associated welding element relatively back to a position between the limits in order to provide further minor adjustments to compensate for minor variations horizontally in the weld seam, and
   (o) another limit switch actuated by each bracket when such bracket is substantially centered between its limits to de-activate the power means and halt the movement of the associated carriage.

4. In a welding machine:
   (a) a boom,
   (b) a carriage movably mounted on the boom,
   (c) a welding head carried by the carriage,
   (d) means mounted on the head for movement between limits, the means including slide means on the head, and a bracket mounted on slide means for movement between such limits,
   (e) a welding element carried by the bracket,
   (f) means miantaining the welding element on a weld seam, and
   (g) means selectively moving the carriage on the boom when the welding element reaches either limit so as to bring the welding element relatively back to a position between the limits in order to provide further minor adjustments within the limits to compensate for minor variations in the weld seam.

5. In a welding machine:
(a) a boom,
(b) a carriage movably mounted on the boom,
(c) a welding head carried by the carriage,
(d) means mounted on the head for movement between limits, said means including
  (1) slide means disposed substantially horizontally on the head, and
  (2) a bracket mounted for substantially horizontal movement on the slide means between such limits,
(e) a support arm mounted on the bracket for substantially vertical movement,
(f) a welding element attached to and carried by the support arm, the welding element being movable within limits both horizontally and vertically to compensate for minor variations in the weld seam, and
(g) means selectively moving the carriage on the boom when the welding element reaches either limit as determined by the movement of the bracket on the slide means so as to bring the welding element relatively back to a position between the limits in order to provide further minor adjustments within the limits to compensate for minor variations in the weld seam.

6. In a welding machine:
(a) a boom,
(b) a carriage movably mounted on the boom,
(c) a welding head carried by the carriage,
(d) means mounted on the head for movement between limits, the said means including
  (1) slide means on the head, and
  (2) a bracket mounted on the slide means for movement between such limits,
(e) a welding element carried by the bracket,
(f) means maintaining the welding element on a weld seam, said means including a fluid ram operatively connected to the bracket and tending to urge the bracket in a direction to hold the welding element on the seam, and
(g) means selectively moving the carriage on the boom when the welding element reaches either limit so as to bring the welding element relatively back to a position between the limits in order to provide further minor adjustments within the limits to compensate for minor variations in the weld seam.

7. In a welding machine:
(a) a boom,
(b) a carriage movably mounted on the boom,
(c) a welding head carried by the carriage,
(d) means mounted on the head for movement between limits, the said means including
  (1) slide means on the head, and
  (2) a bracket mounted on the slide means for movement between such limits,
(e) a welding element carried by the bracket,
(f) means maintaining the welding element on a weld seam, and
(g) means selectively moving the carriage on the boom including
  (1) a control means sensing the position of the bracket at and between the limits, and
  (2) a power means connected to the carriage and actuated by the control means when the welding element reaches either limit so as to move the carriage in a direction to bring the welding element relatively back to a position between the limits in order to provide further minor adjustments.

8. In a welding machine:
(a) a boom,
(b) a carriage movably mounted on the boom,
(c) a welding head carried by the carriage,
(d) means mounted on the head for movement between limits, said means including
  (1) slide means on the head, and
  (2) a bracket mounted on the slide means for movement between such limits,
(e) a welding element carried by the bracket,
(f) means maintaining the welding element on a weld seam, and
(g) means selectively moving the carriage on the boom including
  (1) a control means sensing the position of the bracket at and between the limits, and
  (2) a power means connected to the carriage and actuated by the control means when the welding element reaches either limit so as to move the carriage in a direction to bring the welding element relatively back to a position between the limits in order to provide further minor adjustments,
(h) the control means includes a limit switch at each limit of movement of the bracket and actuated by the bracket in such limit, the said limit switches being connected to the power means to activate the power means to move the carriage in the direction to bring the welding element relatively back to a position between the limits, and
(i) the control means includes another limit switch connected to the power means and actuated by the bracket when the bracket is substantially centered between the limits to de-activate the power means and halt carriage movement.

9. In a welding machine:
(a) a boom,
(b) a first carriage movably mounted on the front side of the boom,
(c) a second carriage movably mounted on the rear side of the boom,
(d) a welding head carried by each carriage, the welding heads being located on the same side of the boom,
(e) means mounted on each welding head for movement between limits,
(f) a welding element carried by the last said means on each welding head,
(g) means maintaining the welding element of each welding head on a weld seam, and
(h) means selectively moving each carriage on the boom independently and selectively when the welding element associated with each carriage reaches either limit so as to bring the welding element relatively back to a position between the limits whereby to provide further minor adjustments within such limits to compensate for minor variations in the weld seam.

10. In a welding machine:
(a) a boom,
(b) a first carriage movably mounted on the front side of the boom,
(c) a second carriage movably mounted on the rear side of the boom,
(d) a welding head carried by each carriage, the welding heads being located on the same side of the boom,
(e) means mounted on each welding head for movement between limits,
(f) a welding element carried by the last said means on each welding head,
(g) the welding heads being rotatively mounted and carried by the carriages on substantially vertical axes in order to align the welding heads laterally with the welding elements of such welding heads in opposed relation facing either inwardly or outwardly, (h) means maintaining the welding element of each welding head on a weld seam, and
(i) means selectively moving each carriage on the boom independently and selectively when the welding element associated with each carriage reaches either limit so as to bring the welding element relatively back to a position between the limits whereby to provide further minor adjustments within such limits to compensate for minor variations in the weld seam.

11. In a welding machine:
(a) a boom,
(b) a first carriage movably mounted on the front side of the boom,
(c) a second carriage movably mounted on the rear side of the boom,
(d) a welding head carried by each carriage, the welding heads being located on the same side of the boom,
(e) means mounted on each welding head for movement between limits,
(f) a welding element carried by the last said means on each welding head,
(g) means maintaining the welding element of each welding head on a weld seam,
(h) the welding heads being rotatively mounted and carried by the carriages on substantially vertical axes in order to align the welding heads laterally with the welding elements of such welding heads in opposed relation facing either inwardly or outwardly,
(i) means selectively moving each carriage on the boom independently and selectively when the welding element associated with each carriage reaches either limit so as to bring the welding element relatively back to a position between the limits whereby to provide further minor adjustments within such limits to compensate for minor variations in the weld seam,
(j) means mounting at least one of the welding heads on its associated carriage to enable relative adjustment to place the welding heads selectively one in front of the other, and
(k) latching means interconnecting the carriages so that such carriages move together as a unit along the boom when the welding heads are arranged one in front of the other in order to weld seams substantially parallel to the path of movement of the carriages along the boom.

12. In a welding machine:
(a) a boom,
(b) a first carriage movably mounted on the front side of the boom,
(c) a second carriage movably mounted on the rear side of the boom,
(d) a welding head carried by each carriage,
(e) means mounted on each welding head for movement between limits,
(f) a welding element carried by the last said means mounted on each welding head,
(g) means maintaining the welding element of each welding head on a weld seam,
(h) means selectively moving each carriage on the boom independently and selectively when the welding element associated with each carriage reaches either limit so as to bring the welding element relatively back to a position between the limits whereby to provide further minor adjustments within such limits to compensate for minor variations in the weld seam, the means selectively moving each carriage on the boom independently includes
(1) a rack extending along each side of the boom, and
(2) power means carried by each carriage, each power means including a pinion engaging the rack on the same side of the boom as the carriage, and
(i) means actuating each power means independently when the welding element associated with the carriage carrying such power means reaches either limit so that engagement of pinion and rack moves the carriage in a direction to bring the welding element relatively back to a position between the limits whereby to provide further minor adjustments within such limits to compensate for minor variations in the weld seam.

13. In a welding machine:
(a) a boom,
(b) a pair of carriages movably mounted on the boom,
(c) a welding head carried by each carriage,
(d) means mounted on each welding head for movement between limits, the last said means mounted on each welding head includes
(1) a slide means on the head, and
(2) a bracket mounted on the slide means for movement between limits,
(e) a welding element carried by each bracket,
(f) means maintaining the welding element of each welding head on a weld seam, and
(g) means selectively moving each carriage on the boom independently and selectively when the welding element associated with each carriage reaches either limit, the last said means including
(1) a control means sensing the position of the bracket at and between the limits, and
(2) power means connected to each carriage and activated by the control means when the bracket of each associated welding head reaches either limit to move the associated carriage in a direction to bring the bracket relatively back to a position between the limits in order to provide further such minor adjustments of the welding element to compensate for minor variations in the weld seam.

14. In a welding machine:
(a) a boom,
(b) a pair of carriages movably mounted on the boom,
(c) a welding head carried by each carriage,
(d) means mounted on each welding head for movement between limits, each of the last said means mounted on each welding head includes
(1) a slide means on the head, and
(2) a bracket mounted on the slide means for movement between limits,
(e) a welding element carried by each bracket,
(f) means maintaining the welding element of each welding head on a weld seam, the last said means includes a fluid ram connected to the bracket and tending to urge the bracket in a direction to hold the welding element on the weld seam, and
(g) means selectively moving each carriage on the boom independently and selectively, the last said means includes
(1) a control means sensing the position of the bracket at and between the limits, and
(2) power means connected to each carriage and activated by the control means when the bracket of each associated welding head reaches either limit to move the associated carriage in a direction to bring the bracket relatively back to a position between the limits in order to provide further such minor adjustments of the welding element to compensate for minor variations in the weld seam.

15. In a welding machine:
(a) a boom,
(b) a pair of carriages movably mounted on the boom,
(c) a welding head carried by each carriage,
(d) means mounted on each head for movement between limits, each of the last said means mounted on each welding head includes
(1) a slide means on the head, and
(2) a bracket mounted on the slide means for movement between limits, (e) a welding element carried by each bracket,
(f) means maintaining the welding element of each welding head on a weld seam, the last said means includes a fluid ram connected to the bracket and tending to urge the bracket in a direction to hold the welding element on the weld seam, and
(g) means selectively moving each carriage on the boom independently and selectively when the welding element associated with the carriage reaches either limit, the last said means includes
   (1) a control means sensing the position of each bracket at and between the limits, and
   (2) power means connected to each carriage and activated by the control means when the bracket of each associated welding head reaches either limit to move the associated carriage in a direction to bring the bracket relatively back to a position between the limits in order to provide further such minor adjustments of the welding element to compensate for minor variations in the weld seam,
(h) the control means sensing the position of each bracket includes
   (1) a limit switch actuated by the bracket in each limit to activate the associated power means to move the associated carriage to bring the bracket relatively back to a position between the limits, and
   (2) another limit switch actuated by the bracket when the bracket is substantially centered between the limits to de-activate the power means and halt the movement of the associated carriage.

References Cited

UNITED STATES PATENTS

| | | | |
|---|---|---|---|
| 2,189,399 | 2/1940 | Lewbers | 219—124 |
| 2,249,413 | 7/1941 | Bechtle et al. | 266—23 |
| 2,670,423 | 2/1954 | Darner et al. | 219—124 X |
| 2,839,663 | 6/1958 | McCollom | 219—125 X |
| 3,072,779 | 1/1963 | Masters et al. | 219—125 |
| 3,125,700 | 3/1964 | Bentley et al. | 219—124 X |
| 3,171,012 | 2/1965 | Morehead | 219—124 |

JOSEPH V. TRUHE, *Primary Examiner.*